US008185526B2

(12) United States Patent  (10) Patent No.: US 8,185,526 B2
Wen et al.  (45) Date of Patent: May 22, 2012

(54) DYNAMIC KEYWORD SUGGESTION AND IMAGE-SEARCH RE-RANKING

(75) Inventors: Fang Wen, Beijing (CN); Jian Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 12/691,181

(22) Filed: Jan. 21, 2010

(65) Prior Publication Data

US 2011/0179021 A1 Jul. 21, 2011

(51) Int. Cl.
*G06F 7/04* (2006.01)
*G06F 17/30* (2006.01)
(52) U.S. Cl. ........ 707/730; 707/723; 707/728; 707/748; 707/750
(58) Field of Classification Search ........... 707/999.003, 707/999.005, 999.107, 723, 728, 730, 748, 707/750, 765, 767
See application file for complete search history.

(56) References Cited

U.S. PATENT DOCUMENTS

| | | | | |
|---|---|---|---|---|
| 8,073,818 | B2 * | 12/2011 | Duan et al. | 707/687 |
| 2005/0055344 | A1 * | 3/2005 | Liu et al. | 707/3 |
| 2006/0204142 | A1 * | 9/2006 | West et al. | 382/305 |
| 2007/0143272 | A1 * | 6/2007 | Kobayashi | 707/3 |
| 2008/0267503 | A1 | 10/2008 | Denoue et al. | |
| 2010/0030735 | A1 | 2/2010 | Curtis et al. | |

OTHER PUBLICATIONS

Baeza-Yates, et al., "Modern Information Retrieval", retrieved on May 26, 2010 at <<http://citeseerx.ist.psu.edu/viewdoc/download;jsessionid=009854520C8F70363495422063F0CD55?doi=10.1.1.27.7690&rep=rep1&type=pdf>>, Addison-Wesley Longman Publishing Co., Jan 1999, 38 pgs.
Ben-Haim, et al., "Improving Web-based Image Search via Content Based Clustering", retrieved on May 26, 2010 at <<http://cseweb.ucsd.edu/~sjb/slam06.pdf>>, IEEE Computer Society, Proceedings of Conference on Computer Vision and Pattern Recognition Workshop (CVPRW), May 2006, pp. 1-6.
Blei, et al., "Modeling Annotated Data", retrieved on May 26, 2010 at <<http://www.cs.princeton.edu/~blei/papers/BleiJordan2003.pdf>>, ACM, Proceedings of International SIGIR Conference on Research and Development in Informaion Retrieval, Toronto, CA, Jul./Aug. 2003, 8 pgs.
Cui, et al., "IntentSearch: Interactive On-line Image Search Re-ranking", retrieved on May 26, 2010 at <<http://www.stanford.edu/~jycui/data/Jingyu_Cui_MM08de.pdf>>, ACM, Proceeding of International Conference on Multimedia (MM), Vancouver, CA, Oct. 26, 2008, pp. 997-998.
Cui, et al., "Real Time Google and Live Image Search Re-ranking", retrieved on May 26, 2010 at <<http://www.stanford.edu/~jycui/data/Jingyu_Cui_MM08.pdf>>, ACM, Proceeding of International Conference on Multimedia (MM), Vancouver, CA, Oct 2008, pp. 1-4.

(Continued)

*Primary Examiner* — James Trujillo
*Assistant Examiner* — Bruce Moser
(74) *Attorney, Agent, or Firm* — Lee & Hayes, PLLC

(57) ABSTRACT

A content-based re-ranking (CBR) process may be performed on query results based on a selected keyword that is extracted from previous query results, and thereby increase a relevancy of search results. A search engine may perform the CBR process using a target image that is selected from a plurality of image search results, the CBR to identify re-ranked image search results. Keywords may be extracted from the re-ranked image search results. A portion of the keywords may be outputted as suggested keywords and made selectable by a user. Finally, a refined CBR process may be performed based on the target image and a received selection a suggested keyword, the refined CBR to output the refined image search results.

20 Claims, 6 Drawing Sheets

OTHER PUBLICATIONS

Duygulu, et al., "Object Recognition as Machine Translation: Learning a Lexicon for a Fixed Image Vocabulary", retrieved on May 26, 2010 at <<http://kobus.ca/research/publications/ECCV-02-1/ECCV-02-1.pdf>>, Springer-Verlag London, Lecture Notes in Computer Science vol. 2353, Proceedings of European Conference on Computer Vision—Part IV, 2002, 15 pgs.

Feng, et al., "Multiple Bernoulli Relevance Models for Image and Video Annotation", retrieved on May 26, 2010 at <<http://citeseerx.ist.psu.edu/viewdoc/download?doi=10.1.1.58.1879&rep=rep1&type=pdf>>, IEEE, Proceedings of Conference on Computer Vision and Pattern Recognition (CVPR), Jun./Jul. 2004, 8 pgs.

"Google Images, Search Images", retrieved on May 26, 2010 at <<http://image.google.com>>, Google, 2010, pp. 1.

Jeon, et al., "Automatic Image Annotation and Retrieval using Cross-Media Relevance Models Relevance Models", retrieved on May 26, 2010 at <<http://citeseerx.ist.psu.edu/viewdoc/download?doi=10.1.1.14.8561&rep=rep1&type=pdf>>, ACM, Proceedings of International SIGIR Conference on Research and Development in Informaion Retrieval, Toronto, CA, Jul./Aug. 2003, 8 pgs.

Jing, et al., "IGroup: Web Image Search Results Clustering", retrieved on May 26, 2010 at <<http://research.microsoft.com/en-us/um/people/leizhang/paper/acmmm06_igroup.pdf>>, ACM, Proceeding of International Conference on Multimedia (MM), Santa Barbara, CA, Oct 2006, 8 pgs.

Liao, et al., "Context Search and Recommendation for Large-Scale Community-Sharing Photos", retrieved on May 26, 2010 at <<http://grid.ntu.edu.tw/html/projects/pro77/pro77.pdf>>, National Taiwan University, TW, Mar. 2009, pp. 1-17.

Lin, et al., "Web Image Retrieval Re-Ranking with Relevance Model", retrieved on May 26, 2010 at <<http://www.informedia.cs.cmu.edu/documents/wi03.pdf>>, IEEE International Conference on Web Intelligence (WIC), Halifax, CA, Oct. 13, 2003, pp. 1-7.

"Picsearch, Innovating Image Search", retrieved on May 26, 2010 at <<http://www.picsearch.com>>, Picsearch, 2010, pp. 1-2.

"Welcome to Windows Live, Search", retrieved on May 26, 2010 at <<http://image.live.com>>, Microsoft Corporation, 2010, pp. 1.

Zha, et al., "Visual Query Suggestion", retrieved on May 26, 2010 at <<http://staff.science.uva.nl/~cgmsnoek/pub/readinggroup/ZhaVisualQuerySuggestion.pdf>>, ACM, Proceedings of International Conference on Multimedia (MM), Beijing, CN, Oct. 19, 2009, pp. 15-24.

Zitouni, et al., "Re-ranking of Web Image Search Results using a Graph Algorithm", retrieved on May 26, 2010 at <<http://figment.cse.usf.edu/~sfefilat/data/papers/TuAT8.5.pdf>>, IEEE, International Conference on Pattern Recognition (ICPR), Dec. 2008, pp. 1-4.

* cited by examiner

DYNAMIC KEYWORD SUGGESTION AND IMAGE-SEARCH RE-RANKING

BACKGROUND

Search engines have been traditionally used to help users to find text-based information that is related to a keyword text search submitted by a user. For example, many popular web search engines return a list of ranked search results (e.g., websites, etc.) in response to a user-submitted search query.

Today, in addition to text-based information, people search the Internet (or other sources of data) for an array of non-textual data that includes images, videos, music, and other type media. Searching of non-textual data presents many challenges and opportunities that may or may not be applicable to searches for text-based information.

When searching for images, a search engine often relies on keywords that are associated with an image. The keywords may be assigned to the image using various techniques. In some instances, text that is associated with the image (e.g. adjacent text, titles, file names, etc.) may be selectively used as keywords for the image. Also, user-assigned keywords may be associated with the image. In this way, users may search for images using text-based queries that return results based on keyword matches between search terms and image keywords.

However, in some instances, the relevance of image search results may be affected by search term ambiguity. Often, users submit a limited number of search terms when searching for non-textual data (i.e., one to two search terms). When a search term has multiple meanings, the search results may include results that are representative of the various meanings. For example, the term "mouse" may refer to a small rodent or a computer peripheral device. When a user submits an image search for a "mouse," the search engine may return results that include images of small rodents and computer peripherals even though the user may intend to search for images of the small rodent.

SUMMARY

Dynamic keyword suggestion and image-search re-ranking may be performed by a search engine to increase a relevancy of search results. A content-based re-ranking (CBR) process may be performed on query results based on a selected keyword that is extracted from previous query results, and thereby increase a relevancy of search results.

In various embodiments, a search engine may perform the CBR process using a target image that is selected from a plurality of image search results, the CBR to identify re-ranked image search results. Keywords may be extracted from the re-ranked image search results. A portion of the keywords may be outputted as suggested keywords and made selectable by a user. Finally, a refined CBR process may be performed based on the target image and a received selection a keyword, the refined CBR to output the refined image search results.

In some embodiments, keywords are assigned a weight and the suggested keywords are selected for presentation to a user based on the weight. The weight may be calculated based at least in part on a frequency of each of the keywords. In further aspects, the CBR may include a distance value used to obtain the re-ranked image search results. The weight assigned to the keyword may be inversely proportional to the distance value of the associated image search result. Thus, the suggested keywords may be ranked to enable presentation of the most relevant keywords to a user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, keywords may be used in a search for images but may return search results that are not relevant to the user's search intention because of keyword ambiguity, mislabeling of keywords, and so forth. Although it may be difficult to return search result that are all relevant, it is possible to improve a relevancy of search results.

One technique that may provide relevant search results is content-based re-ranking (CBR). Generally in CBR, images are analyzed and then assigned to a category representative of the analyzed characteristics of the image. A representative (target) image is selected from search results from a search query. Next, the search results are re-ranked or otherwise sorted/displayed to present images within a same category as the target image as these images are most likely to be perceived as relevant to the user. In addition, other factors in addition to or besides category information may be used by the CBR process to identify relevant search results.

As described herein, the CBR process may be expanded by extracting keywords from the re-ranked search results, which may ultimately expand the number of relevant returned search results. A list of suggested keywords may be presented to a user after the re-ranking process. Upon a selection of one or more keywords, the re-ranking process may be performed a second time based on search results that include the additional keywords. Ultimately, the re-ranking and expanded keywords may produce an expanded set of relevant search result to help a user locate a desired image or other type of media.

The process and systems described herein may be implemented in a number of ways. Example implementations are provided below with reference to the following figures.

Illustrative Environment

Figure 1:
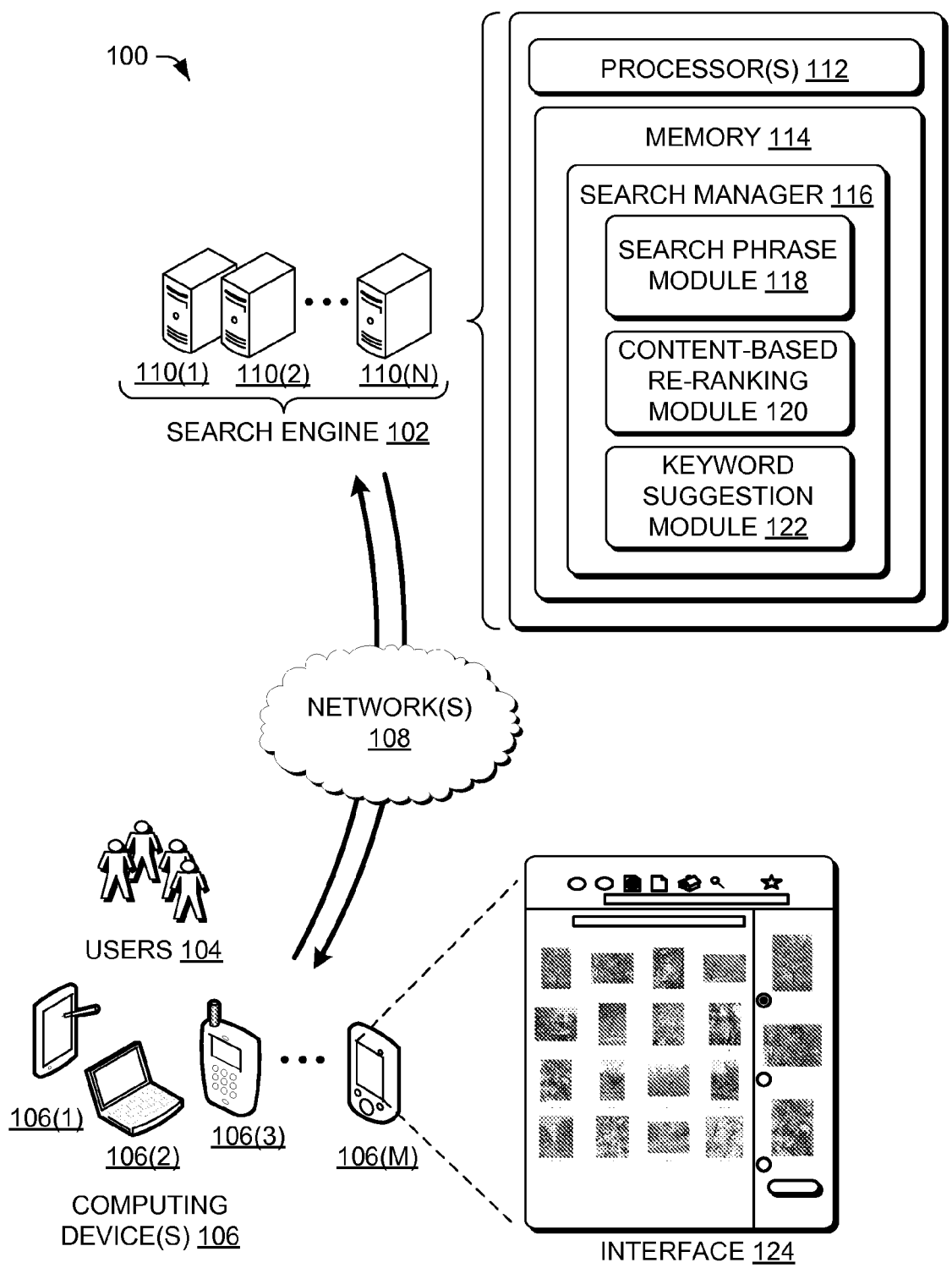
FIG. 1 is a schematic diagram of an illustrative environment that includes a search engine to perform dynamic keyword suggestion and image-search re-ranking.

FIG. 1 is a schematic diagram of an illustrative environment 100 that includes a search engine to perform dynamic keyword suggestion and image-search re-ranking. The environment 100 may include a search engine 102 that provides search results to users 104 via computing devices 106 in response to user-submitted queries. The search engine 102 may be in communication with the computing devices 106 via one or more network(s) 108. In some embodiments, the search engine 102 may be a local machine that is used directly by the users 104.

In accordance with various embodiments, the search engine may be hosted by various servers, such as servers 110(1), 110(2), . . . , 110(N). For example the servers 110(1)-(N) may be configured as a server farm, among many other possibilities. The search engine 102 may be configured to receive user requests from the users 104, via the computing devices 106, run search queries and then return search results based on the user requests. For example, the user requests may include a text-based search phrase, an object selection (e.g., desired similarity image selection, etc.), or a combination of the above.

As illustrated, the search engine 102 is equipped with one or more processors 112 and memory 114. The memory 114 may include applications, modules, and/or data. In some embodiments, the memory 114 may include a search manager 116, which may facilitate search phrase queries, content based re-ranking, keyword association, and other related search operations.

The search manager 116 may include a number of modules such as a search phrase module 118, a content-based re-ranking (CBR) module 120, and a keyword suggestion module 122. Collectively, the modules may perform various operations to enable dynamic keyword suggestion and image-search re-ranking to enable the users 104 to find more relevant search results based on inputted search phrases and selected target images as explained below. Each of these modules is described in turn.

In accordance with one or more embodiment, the search phrase module 118 may receive a search phrase (e.g., one or more search terms, keywords, etc.) and then return a selection of corresponding search results. The search phrase module 118 may identify search results by matching text-based information associated with candidates. For example, the candidates may include images that have associated keywords. The search phrase module 118 may select, and possibly rank, images based on a match of the search phrase and the keywords of the images. Other types of candidates, such as music, videos, and other objects, may also be searched by the search phrase module 118 to produce search results based on textual information.

In some embodiments, the search phrase may be generated based on an object selection rather than by receiving text from a user. For example, a user may select an image, which has keywords that are used to generate the search phrase.

In various embodiments, the CBR module 120 may enable selection of a target (representative) object (e.g., image, video file, audio file), and then re-rank search results based on information from the target object. For example, the target object may be a target image and the information may be a shared category of the target image. The re-ranked results may be selected based on having the shared category of the target image, based on a distance calculation representative of strength of the category classification. It may follow that these re-ranked results are images (or other objects) that are most likely to be perceived as relevant to the searcher (e.g., one of the users 104).

In some embodiments, the keyword suggestion module 122 may identify suggested keywords from re-ranked results. The suggested keywords may be made available for selection and use in an additional query, such as a CBR query, to make a refinement (increase relevancy, expand search results, etc.) of the initial search results, thus creating refined search results. Returning to the image example above, the suggested keywords may be selected from images having the same category. Further, the suggested keywords may be ranked based on factors such as frequency of occurrence, an inverse proportionality to the distance calculation of the result, or based on other factors. The suggested keywords with the highest weights may be selected and displayed to a searcher (e.g., the user) to enable a refined search.

As discussed above, the search engine 102 may transmit data, such as search results, user interface data, and the like to the users 104 via the computing devices 106. The computing devices 106 may include, without limitation, tablet computer 106(1), a personal computer 106(2), a mobile telephone 106 (3), a personal digital assistant (PDA) 106(M). Other computing devices are also contemplated such as a television, a set top box, a gaming console, and other electronic device that can connect to the network 108 and display information. Each of the computing devices 106 may include one or more processor(s) and memory. The memory may be used to store a browser or other application which may provide an interface 124 between the users 104 and the search engine 102.

The interface 124 may include various elements to enable the users 104 to communicate with the search engine 102. For example, the interface may include input fields, selectable objects, and other portions that enable data manipulation and/or data input (e.g., via a keyboard, mouse, voice command, touch screen display, etc.).

Using the interface 124, one of the users 104 may submit a search query to the search phrase module 118. The interface 124 may display a first set of search results that may enable a user-selection of a target image for a second query using the CRB module 120. The interface 124 may then display a second set of re-ranked results that include suggested keywords produced by the keyword suggestion module 122. Finally, upon selection of a modified search phrase (based on one or more selected keywords), the CBR module 120 may identify refined search results that the user may perceive as more relevant than the previous search results.

Figure 2:
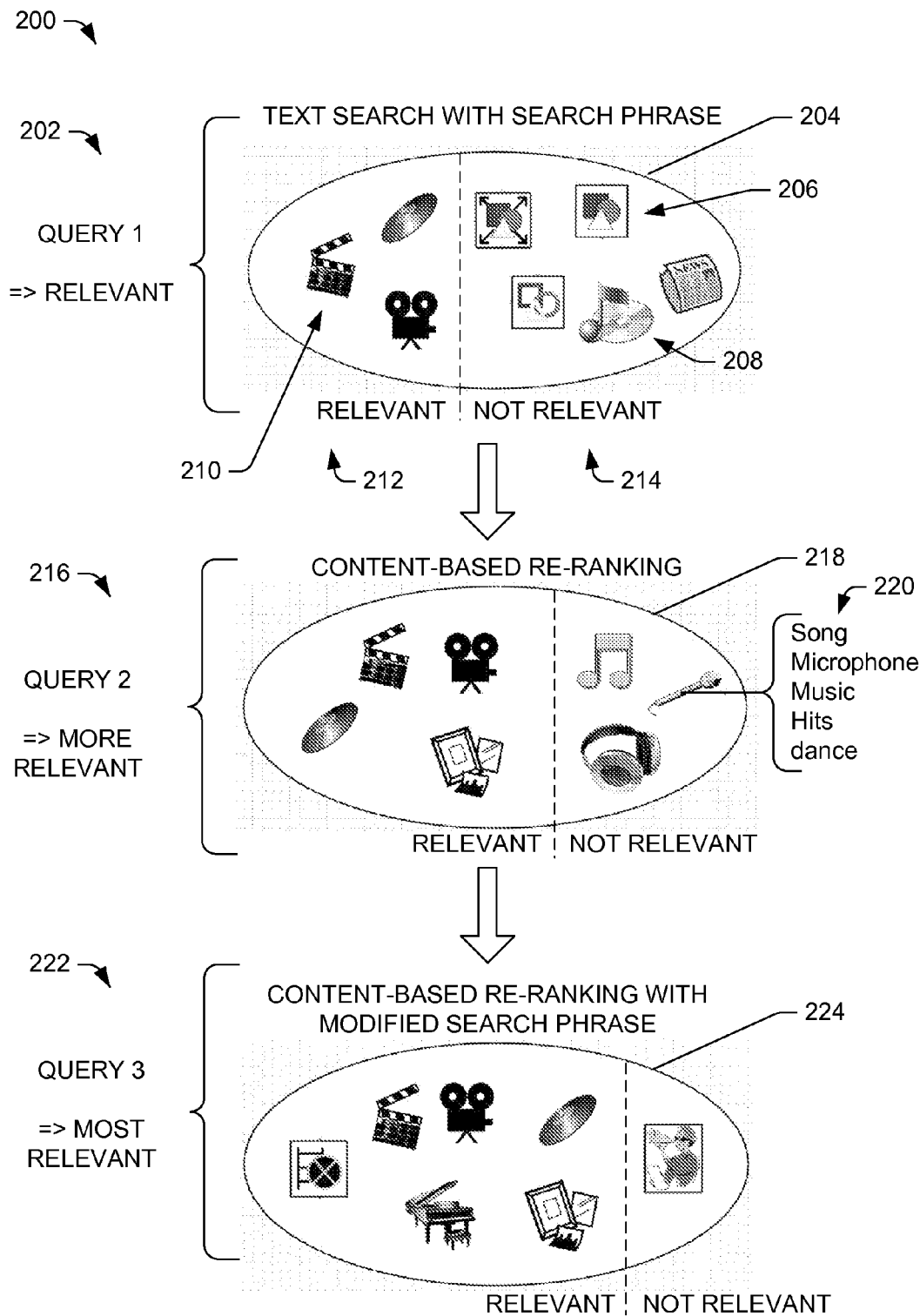
FIG. 2 is a schematic diagram of an illustrative image search using search phrases, image-search re-ranking, and keyword suggestions.

FIG. 2 is a schematic diagram of an illustrative image search results 200 using search phrases, image-search re-ranking, and keyword suggestions. The illustrative images searches may be resultants from the search manager 116, and more specifically the search phrase module 118, the content-based re-ranking (CBR) module 120, and the keyword suggestion module 122 as described above and shown in FIG. 1.

A first query 202 may perform a text search based on a search phrase having one or more search terms. For example, a user may desire to find objects that are associated with the phrase "apple" or "apple fruit." The search engine 102 of FIG. 1, upon receive of the search phrase, may perform a text search by locating objects with one or more keyword(s) that match some or all of the search phrase. Search results (the located objects) 204 may include an array of different types of objects and/or objects of a same type from different categories. For example, the objects may include images 206, audio files 208, and/or video files 210, among other types of searchable objects.

For illustrative purposes, the search results may be quantifiable as relevant or not relevant to an intended result based on the search term. For example, a user may intend to search for an image of golden delicious apple but may only include the search phrase "apple". In this example, the search results may include relevant search results (objects having the golden delicious apple), but also non-relevant search results that may include company logos, trees, products, and so forth. Thus, for illustrative purposes, the search results may be grouped as relevant 212 and not relevant 214.

A second query 216 may perform a content-based re-ranking (CBR) process on the search results 204. The CBR process may rank or otherwise associate images based on image features, attributes, categories, or other techniques to provide re-ranked search results 218 that include a greater portion of relevant results than the first query 202.

In some embodiments, the CBR may re-rank objects, such as images, by categorizing the objects into various predetermined categories. For example, when the objects are images, the categories may include without limitation, (1) general object Images containing close-ups of general objects; (2) images having objects with simple a background; (3) scenery images; and (4) portrait images. However, more or fewer categories may be used and the categories may vary based on the type of object (e.g., different categories for audio, video, and still images, etc.). During the CBR process, resulting objects having the same category as a target object (selected by a user to initiate the CBR process), may include a distance value as a measure of the strength of the relationship of the object to the category. For example, if the object is a strong candidate for a category, the distance value may be low (close fit) while an object that is a weak candidate for the category may have a large distance value that indicates the image is a poor representative sample for the category.

Each object may include keywords 220, which enable the text-based search performed by the first query 202. These keywords may be used to refine a search in a third query 222. As discussed in further detail below with respect to FIG. 5, the distance value may be used to weight selections of the keywords 220 and ultimately produce a refined set of search results.

In accordance with some embodiments, the third query 222 may perform another CBR process on the search results 204. The CBR process may expand a relevancy of the re-ranked search results by performing the CBR process on search results using a modified search phrase. The modified search phrase may include one or more of the keywords identified from the re-ranked search results 218. The third query 222 may produce refined search results 224 that include a greater portion of relevant results than the re-ranked search results 218 that were produced without using the keywords to create a modified search phrase.

Illustrative Operation

Figure 3:
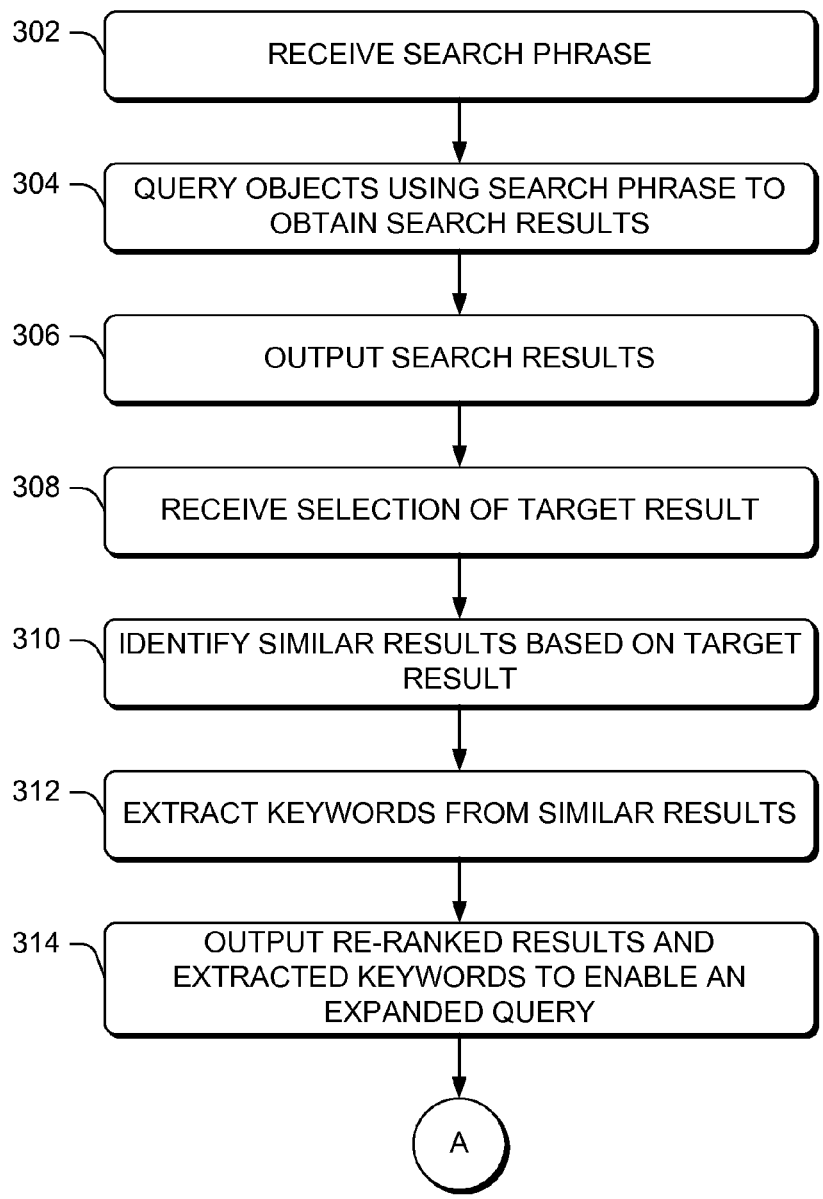
FIG. 3 is a flow diagram of an illustrative process of extracting suggested keywords from image results of an image-search and re-ranking query.

FIG. 3 is a flow diagram of an illustrative process 300 of extracting suggested keywords from image results from an image-search and re-ranking query. The process 300 may be performed by the search engine 102 as discussed with reference to FIG. 1.

The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

At 302, the search engine 102 may receive a search phrase from one of the computing devices 106. The search phrase may be a user-generated combination of one or more search terms (words) selected by one of the users 104. In some instances, the search phrase may be generated by a user selection of an image, which includes associated keywords that may be used to generate the search phrase.

At 304, the search engine 102 may query objects using the search phrase to obtain search results. For example, the search phrase module 118 may match portions of the search phrase to keywords of objects. The keywords of objects may include user-defined labels (e.g., tags), filename information, attributes, or other textual information associated with an object. In some instances the search results may be ranked to provide search results with the highest ranking, and thus most likely to be relevant to the search phrase. For example, search results that match multiple search terms in the search phrase may be ranked higher than single matches. The search engine 102 may output the search results at 306.

At 308, the search engine 102 may receive a selection of a target result. The target result may be used to perform a CBR of the search results obtained at 306 or similar search results obtained from the search phrase of 302.

At 310, the CBR process may identify re-ranked search results by re-ranking objects. For example, the CBR process may categories objects, compute a distance value, and then select objects that share a category with the target result and have a lowest distance (closest result).

At 312, suggested keywords may be extracted from the re-ranked search results. In some embodiments, the keywords may be weighted and/or scored prior to a presentation to a user to provide a presentation of common (most relevant) keywords. In some embodiments, the extraction process may omit stop words and an original search term used to obtain the plurality of image search results that include the target image.

Figure 6:
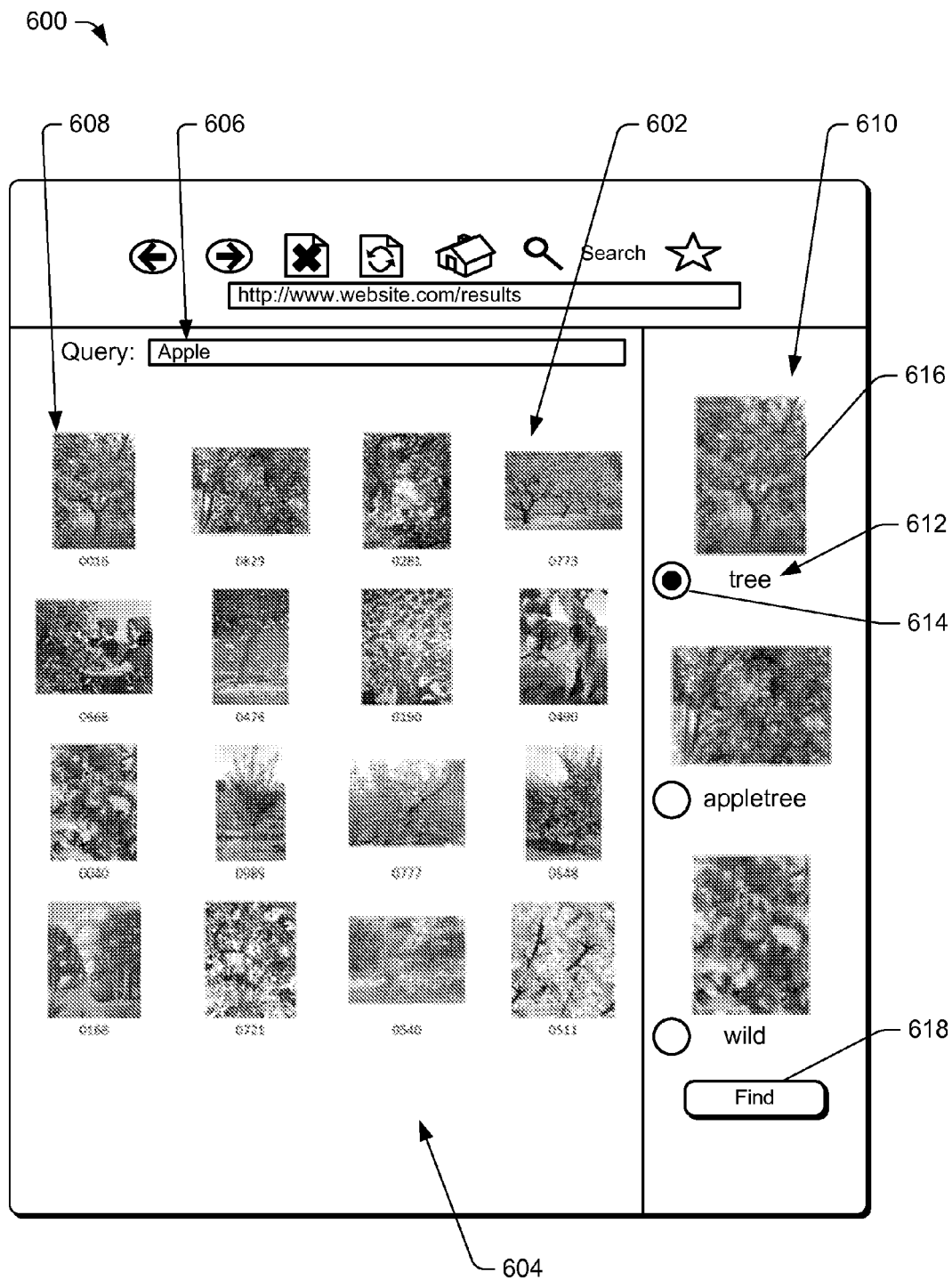
FIG. 6 is an illustrative image search page that enables a user to select suggested keywords to expand a quantity of relevant images in an image search result.

At 314, the search engine 102, via the keyword suggestion module 122, may output the re-ranked results and the suggested keywords to enable an expanded query to produce refined search results. The suggested keywords may be extracted from the refined search results. An example user interface that provides the re-ranked results and suggested keywords is shown in FIG. 6 and will be discussed below.

Figure 4:
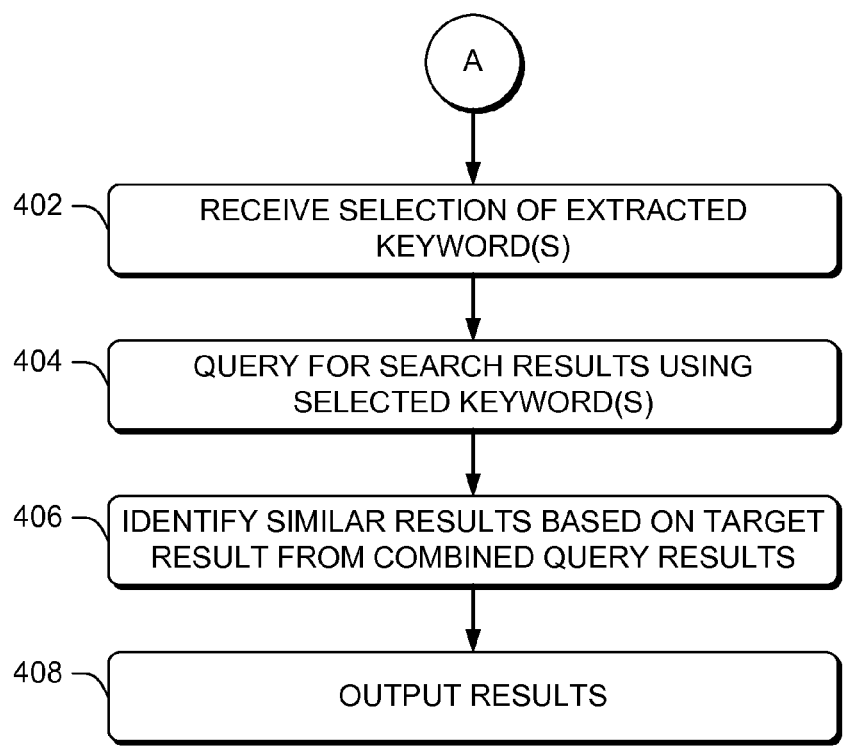
FIG. 4 is a flow diagram of an illustrative process of re-ranking images that include using a selected suggested keyword to expand a quantity of relevant images in an image search result.

FIG. 4 is a flow diagram of an illustrative process 400 of re-ranking images that include a selected suggested keyword to expand a quantity of relevant images in an image search result. The process 400 may be an extension of the process 300 described with reference to FIG. 3. The order of operations is not intended to be construed as a limitation.

At 402, the search engine 102 may receive a selection of suggested keywords. The suggested keywords may be presented to the user for selection. In some embodiments, the suggested keywords may be used to create a modified search phrase, which may obtain additional search results via a query.

At 404, the search engine 102 may query search results using the keywords and/or modified search phrase. In some embodiments, the query may be performed by the search phrase module 118 and may be similar to the query performed at 304 but with a modified search phrase based on a user selection of one or more of the suggested keywords.

At 406, the CBR module 120 may re-rank an output of the query at 404 to provide refined search results. In some embodiments, the target result selection received at 308 may be used for the CBR process. In various embodiments, a new target result may be selected from the search results of the query performed at 404.

At 408, the refined search results may be output. For example, the refined search results may be displayed to a user via one of the computing devices 106.

Figure 5:
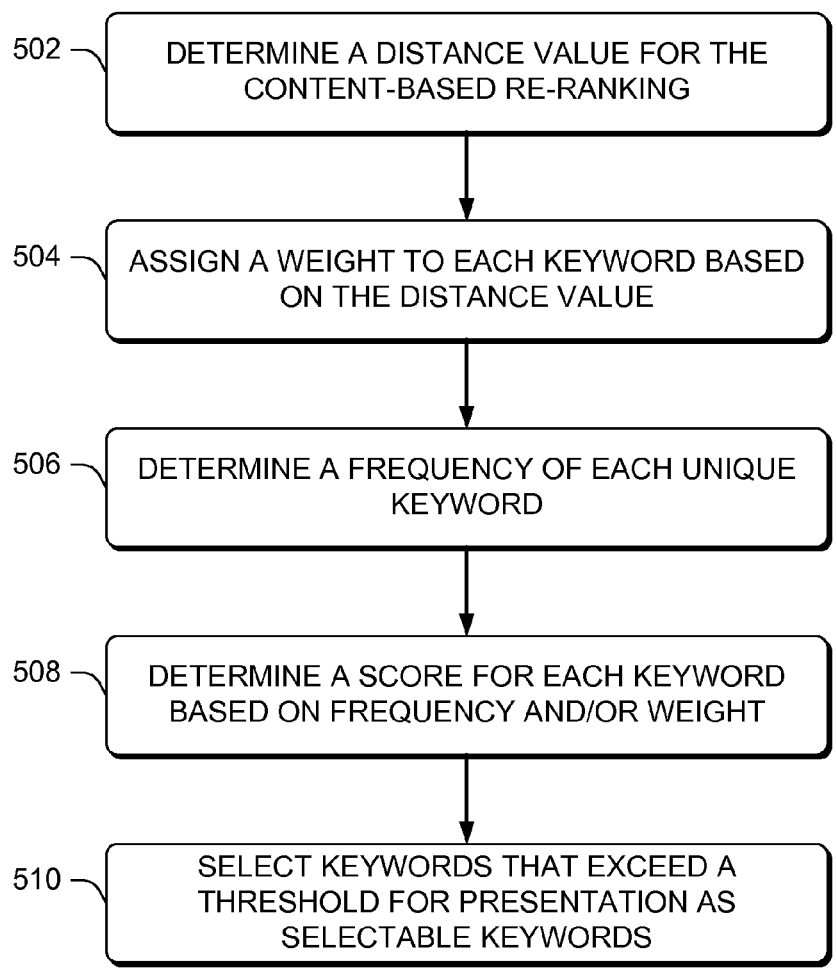
FIG. 5 is a flow diagram of an illustrative process of ranking keywords using information from image-search and re-ranking results.

FIG. 5 is a flow diagram of an illustrative process 500 of ranking keywords using information from image-search and re-ranking results. Generally speaking, the process 500 is performed to enable display and selection of most relevant keywords for a particular search. Thus, keywords are weighted and/or ranked to present a portion of all possible keywords to a user for selection and possibly another re-ranking process. Again, the order of operations is not intended to be construed as a limitation and the process 500 may be performed by the search engine 102 as discussed with reference to FIG. 1.

At 502, the content-based re-ranking module 120 may determine a distance value for the content-based re-ranking. For example the distance value may be an integer value between 0 and n, where a low value indicates that an image is very similar to another image and a high value may indicate the image is dissimilar from another image.

At 504, the keyword suggestion module 122 may assign a CBR weight to each keyword based on the distance value. The CBR weight may be correlated to the distance value determined at 502. For example, a search result that has a low distance value may be assigned a high weight value to increase the keyword's weight, and thus ranking, thereby increasing a likeliness of the keyword being made selectable for an additional search and/or re-ranking process.

At 506, the keyword suggestion module 122 may determine a frequency of each unique keyword. For example, each instance of a particular keyword may be tallied by the keyword suggestion module 122.

At 508, the keyword suggestion module 122 may determine a score for each keyword based on the frequency of the keyword and/or the weight of the keywords. In some embodiments, the weights of the keywords may be summed and then divided by the number of search results, which may give a weighted frequency.

At 510, the keyword suggestion module 122 may select keywords that exceed a threshold for presentation as selectable suggested keywords. For example, the weighted frequency may be compared to the threshold. The threshold may be a percentage (top eighty percentile), firm value (e.g., greater than x, or greater than or equal to x, where x is the threshold), or top quantity limit (e.g., top five keywords).

Although the process 500 may be calculated in various ways, one illustrative calculation is provided below. However, the process 500 is not limited to the calculations that follow.

For a target image i, let V S(i) denote a top k number of visually similar images. For each image j∈V S(i), denote W(j) as the collection of words extracted from image j. The term frequency of w∈W(j) in the image j may be calculated in Equation 1.

$$tf(w, j) = \frac{\text{occurrence}(w, j)}{\text{MaxOccurrence}(j)}$$ Equation (1)

In Equation 1, the occurrence(w, j) denotes the number of times word w occurs in the textual information of image j. The MaxOccurrence is defined in Equation 2.

$$\text{MaxOccurrence}(j) = \text{Max}_{w' \in W(j)}\{\text{occurrence}(w', j)\}$$ Equation (2)

Each image j has a weight(j) according to its distance value dis(i, j) to the target image I as shown in Equation 3.

$$\text{weight} = e^{\frac{dis^2(i,j)}{\sigma^2}}$$ Equation (3)

σ is selected to be the median of the visual distances of the visually similar images to the target image. Each word w has an inverse document frequency(idf) value. The total number of images may be denoted as (N), and then idf(w) may be calculated as shown in Equation 4.

$$idf(w) = \ln\frac{N}{|\{j \mid w \in W(j)\}|}$$ Equation (4)

Next, each word w's score may be calculated as the weighted sum of the tf values among the visually similar images, multiplied by an inverse document frequency value as shown in Equation 5.

$$\text{Score}(w) = idf(w) \times (\Sigma_{j \in VS(I)} \text{weight}(j) \times tf(w,j))$$ Equation (5)

Illustrative User Interface

FIG. 6 is an illustrative image search page 600 that enables a user to select suggested keywords to expand a quantity of relevant images in an image search result. The page 600 may include a search result section 602 that contains re-ranked search results 604 that may returned from the query issued at the operation 314 of FIG. 3.

In accordance with embodiments, the re-ranked search results 604 may originate from a search phrase 606 that provides initial search results. A target image 608 may be selected from the initial search results and used to generate the re-ranked search results 604, as shown in the search result section 602.

In various embodiments, a suggested keyword section 610 may be displayed adjacent to the search result section 602. The suggested keyword section 610 may include suggested keywords (or phrases) 612 and corresponding selection objects 614. The suggested keywords 612 may be keywords extracted from the re-ranked search results 604. In some embodiments, the suggested keywords 612 may be shown with representative objects 616 (e.g., images). The representative objects 616 may be objects that have the highest ranking based on weights and/or frequency of keywords in accordance with the process 500.

The suggested keyword(s) 612 may be selected and used to perform a refined search as discussed with reference to FIG. 4, operations 402 and 404. For example, a user may select one or more of the suggested keywords 612 and issue a refined query by selecting a command 618. Next, a refined query may be performed that uses one or more of the suggested keywords 612 (e.g., "tree") and the original query term (e.g., "apple") to create a modified search phrase that provides, in conjunction with the CBR process, refined results that are more relevant than the re-ranked search results 604.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A computer-implemented method comprising:
performing content-based re-ranking (CBR) based at least in part on a target image that is selected from a plurality of image search results, the CBR to identify re-ranked image search results;
extracting keywords associated with the re-ranked image search results;
outputting at least a portion of the keywords as suggested keywords with the re-ranked image search results, the suggested keywords used to query refined image search results; and
performing a refined CBR based on the target image and a received selection of at least one of the suggested keywords, the refined CBR to output the refined image search results.

2. The computer-implemented method as recited in claim 1, wherein each keyword is assigned a score, and wherein a suggested keyword is selected based on the respective score.

3. The computer-implemented method as recited in claim 2, wherein each score is calculated based at least in part on a frequency and a CBR weight of each of the keywords.

4. The computer-implemented method as recited in claim 3, wherein the CBR includes a distance value used to obtain the re-ranked image search results, and wherein the CBR weight is inversely proportional to the distance value of the associated image search result.

5. The computer-implemented method as recited in claim 1, wherein the keywords are at least one of user-assigned words associated with an image, a portion of a filename, or an attribute of the image.

6. The computer-implemented method as recited in claim 1, wherein the keywords are selected from a collection of words associated with the re-ranked image search results that omit stop words and an original search term used to obtain the plurality of image search results that include the target image.

7. The computer-implemented method as recited in claim 1, wherein the outputting the at least a portion of the keywords with the re-ranked image search results includes outputting a representative image with the at least a portion of the keywords.

8. The computer-implemented method as recited in claim 1, further comprising:
causing a first display that includes the image search results;
causing a second display that includes the re-ranked image search results; and
causing a third display that includes the refined image search results.

9. A system comprising:
one or more processors; and
memory to store computer-readable instructions that, when executed on the one or more processors, cause the one or more processors to perform acts comprising:
receiving a selection of a target image from search results based on a search phrase;
generating re-ranked search results from content-based re-ranking (CBR) of the search results based on the target image;
extracting keywords associated with the re-ranked search results;
outputting at least a portion of the keywords as modified search phrases with the re-ranked search results;
generating refined search results from a refined CBR based on the target object and a received selection of at least one of the modified search phrases; and
outputting the refined search results.

10. The system as recited in claim 9, wherein the generating refined search results further includes:
selecting candidate objects using the modified search phrase, and
re-ranking the candidate objects based on the target image.

11. The system as recited in claim 9, wherein each keyword is assigned a score, and wherein the at least a portion of the keywords are selected based on the respective score.

12. The system as recited in claim 11, wherein the score is calculated based on a frequency and a CBR weight of each of the keywords.

13. The system as recited in claim 12, wherein the CBR includes using a distance value associated with each re-ranked search result to select the re-ranked search results, and wherein the CBR weight is inversely proportional to the distance value of the associated search result.

14. The system as recited in claim 9, wherein the outputting the at least a portion of the keywords with the re-ranked image search results includes outputting a representative image with the at least a portion of the keywords.

15. A method, comprising:
generating re-ranked search results from a content-based re-ranking (CBR) of search results based on a target object that is selected from the search results;
creating a list of suggested keywords from keywords associated with the re-ranked search results;
outputting at least a portion of the suggested keywords; and
generating refined search results from a refined CBR based on the target object and a received selection of at least one of the suggested keywords.

16. The method as recited in claim 15, wherein the keywords include a score representative of at least one of the frequency of occurrence of each keyword or a distance value of an associated object of each keyword.

17. The method as recited in claim 16, wherein the list of suggested keywords is assembled by selecting keywords based on the score of each keyword.

18. The method as recited in claim 15, wherein the list of suggested keywords includes a representative image for each suggested keyword.

19. The method as recited in claim 15, wherein the keywords are user-assigned words associated with the re-ranked search results.

20. The method as recited in claim 15, wherein the target object is one of an image or a video.

* * * * *